Figure 1:
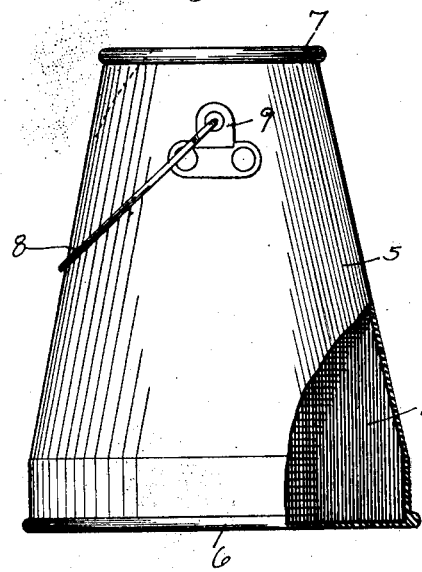
Figure 2:
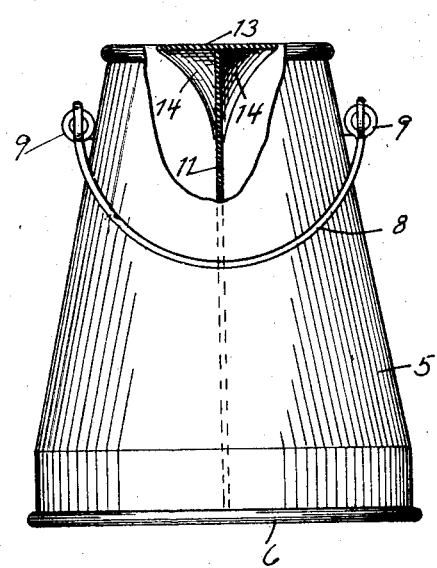
Figure 3:
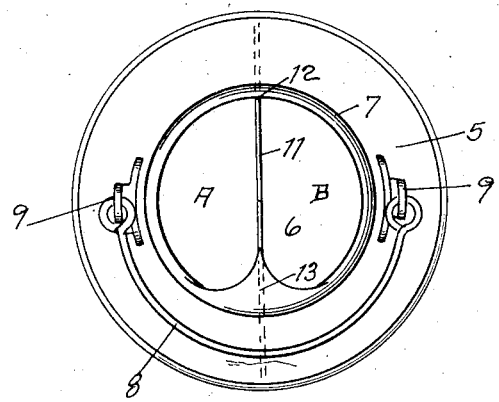

July 12, 1927.

D. W. BENNETT

MILKING PAIL

Filed July 19, 1926

1,635,921

Inventor.
D. W. BENNETT
By Victor J. Evans
Attorney.

Patented July 12, 1927.

1,635,921

UNITED STATES PATENT OFFICE.

DONALD W. BENNETT, OF WINTON, CALIFORNIA.

MILKING PAIL.

Application filed July 19, 1926. Serial No. 123,549.

This invention relates to improvements in milking pails.

The principal object of this invention is to provide a milking pail which will handle the milk from a double milking machine so that the milk being delivered from each cow may be accurately weighed and gauged for the ingredients thereof.

Another object is to produce a milk pail which is simple in construction, one which may be easily cleaned and one which will conform to the ordinary shape of milking pails commonly employed with milking machines.

A further object is to provide means whereby the milk received within the pail may be poured out into a single container, at which time the milk in the two portions of the pail will become mixed.

A still further object is to provide means whereby the contents of the two portions of the pail may be poured simultaneously but into individual receptacles thereby preventing the mixing of the milk contained in the opposite sides of the pail.

Other objects and advantages will be apparent during the course of the following description.

In the accompanying drawings forming a part of this specification, and in which like numerals are employed to designate like parts throughout the same, Figure I is a side elevation of an ordinary milking machine pail partly broken away so as to illustrate a division wall contained therein, Figure II is a view similar to Figure I but at right angles thereto, partly broken away so as to illustrate the pouring feature of the pail, and Figure III is a top plan view of my pail.

In the employment of milking machines, it is common to place a pail between two cows and to deliver the milk from each cow to the same milking pail. This results in the milk from the two cows being mixed and the only method in which to prevent this mixture, so as to test the milk from the individual cow is to shut off one side of the machine which of course causes a delay in the milking operation. This is a serious matter when a large number of cows are being milked as for instance in a large dairy farm, and accordingly, I have devised a pail wherein the individual milk from each cow may be accurately checked at each milking if desired, without the loss of time in the milking operation.

This also permits the testing of the milk for butter fat and other solids as is commonly done in modern dairies.

In the accompanying drawings wherein for the purpose of illustration is shown a preferred example of my invention, the numeral 5 designates a pail as a whole having a bottom 6 and an open top 7. The customary bail 8 is secured to the pail 5 as by ears 9.

Within the pail I place a division plate 11, which plate divides the interior of the pail into two equal sections. At the point 12 this division plate approaches the top and is flush therewith, while at 13 I have placed a plate which is soldered or otherwise secured to the top 7 and to the upper extremity of the division plate 11.

At 14, I have shown fillers, which fillers are secured to the plate 13, to the pail 5 and to the division plate 11. The purpose of this plate 13 and fillers 14 is to form pouring means upon opposite sides of the division plate.

The manner of using my pail is as follows:—

Assuming that a standard milking machine is employed therewith in such a manner that the milk from one of the cows will be discharged into the side of the pail designated by the letter A, while the milk from the other of the cows will be discharged into the receptacle B. The result will be that the milk from these two cows will not become mixed.

Now assuming that it is not desired to keep this milk separated, the operator in pouring from the pail to the straining and cooling tank will pour so that the milk will be discharged from the side where the division plate joins the top as designated at 12.

Should it be desired to maintain the milk from the two cows in a separate state, the pail will be tipped in a reverse direction so that the milk will be discharged over the fillers 14 and plate 13. If two receptacles are now positioned so as to receive these two separate streams issuing from the pail, it will be readily seen that the streams will be kept separated a considerable distance by the plate 13, and may therefore be readily received in the two individual receptacles into which the milk is to be poured.

It is to be understood that the form of my invention herewith shown and described is to be taken as a preferred example of the same and that various changes relative to the size, shape and arrangement of parts may be resorted to without departing from the spirit of the invention or the scope of the subjoined claim.

Having thus described my invention, I claim:—

In a milking pail having an open top and a closed bottom, a division plate positioned within said pail, and vertically disposed therein, a horizontally disposed plate secured to the top of said pail and to said division plate, and fillers positioned adjacent said division plate and said horizontally disposed plate, for the purpose specified.

In testimony whereof I affix my signature.

DONALD W. BENNETT.